3,457,352
METHOD FOR COMBATING MICRO-ORGANISMS WITH SODIUM MONOCHLORACETALDEHYDE BISULFITE
Walter Hafner, Furth, near Deisenhofen, Bavaria, and Karl Milles and Erwin Kopp, Munich, Bavaria, Germany, assignors to Consortium fur Elektrochemische Industrie G.m.b.H., Munich, Bavaria, Germany, a corporation of Germany
No Drawing. Filed Aug. 13, 1965, Ser. No. 479,666
Claims priority, application Germany, Aug. 19, 1964, C 33,673
Int. Cl. A01n 9/14
U.S. Cl. 424—315     2 Claims

ABSTRACT OF THE DISCLOSURE

This invention provides a substance for combating micro-organisms having sodium monochloracetaldehyde bisulfite as the active ingredient.

---

This invention relates to the combating of micro-organisms. More specifically it is directed to methods of combating micro-organisms involving the use of a monochloracetaldehyde bisulfite and of compositions comprising a monochloracetaldehyde bisulfite as active ingredient. Furthermore the invention is concerned with the incorporation of a monochloracetaldehyde bisulfite into a large number of technical products and preparations to be protected from the action of micro-organisms. Additionally the invention relates to the compositions, technical products and preparations containing a monochloracetaldehyde bisulfite themselves. Various other objects and advantages will be apparent, as the nature of the invention is more fully disclosed.

The invention is based on the discovery of the remarkable microbiocidal characteristics of monochloracetaldehyde bisulfites, which are easily handled, almost completely odorless, hardly toxic substances and have, surprisingly, the effect of bactericides, fungicides and also algicides. As a result of such discovery it is possible, to produce valuable compositions for the combating of bacteria, fungi and algae and to prevent the growth and the action of such micro-organisms by applying a monochloracetaldehyde bisulfite or a composition comprising it to the locus to be protected or incorporating it into the materials to be protected. The application of the substance or of the compositions may be effected by spraying, dusting, brushing, immersing or by other suitable means, the incorporation by known techniques of mixing or compounding.

It is known, that free chloracetaldehyde has the effect of an insecticide, fungicide, nematocide and herbicide. Also an effect as algicide has been proved. However, due to its extremely irritating effect on eyes and mucous membranes, it can hardly be used to a great extent for the combating of micro-organisms. Contrary to the free aldehyde, monochloracetaldehyde bisulfites do not have such detrimental effects. Moreover, they are very stable. Therefore, it is also an object of the invention to provide stable, odorless, nonirritating and substantially nontoxic microbiocidal compositions, which are useful as disinfectants and as preservatives with bactericide, fungicide and algicide effect in numerous situations in the industrial and agricultural arts.

These compositions may consist of or comprise, for instance, powdery mixtures of a monochloracetaldehyde bisulfite with inert diluents, such as kieselguhr, talc, kaolin. In similar manner, an absorbent may be impregnated with solutions of the active ingredient. There is also a very wide field for direct application of solutions of monochloracetaldehyde bisulfites. Examples of suitable solvents comprise water, alcohols, including glycols and glycerine, ketones as acetone and mixtures thereof. The solutions may contain additives as wetting or enveloping agents. The active ingredients of the instant invention may also be distributed in the nebulized state by means of known aerosol-techniques. They may be combined with other microbiocidal or pesticidal substances, for instance, insecticides. As monochloracetaldehyde bisulfites retain their activity also in the presence of surface active substances, they are valuable for compounding with washing-, cleaning-, rinsing agents, and soaps. Other preparations include ointment bases and powders. There is also possible a combination with hydrophobing substances, e.g. metal stearates, for the simultaneous preservation of the objects, which are treated to make them water repellent. Typical concentrations of monochloracetaldehyde bisulfites in compositions will range from 0.02 to 10%, based on the weight of the composition. In many cases, concentrations from 0.1 to 5% by weight will be applied.

Such preparations are intended for the protection of various organic materials from attack by micro-organisms. Among such applications are: The preservation of plants, plant products, wood, for instance lumber, flooring, timber, fibrous materials, fabrics, textiles, packaging materials, paper, wool. Compositions comprising monochloracetaldehyde bisulfites (as in the form of solutions, emulsions, fumigants, and sprays) are valuable as disinfectants for all purposes of disinfecting articles, consumer items, plastic materials, floors, rooms. They may be used in the care of the body. Also cleaning-, washing- and rinsing-systems are disinfected and get disinfecting properties by means of the inventive substances. Materials that can be washed even on an industrial scale with such systems include cellulose-containing (cotton) as well as polypeptide-containing (wool) or synthetic fiber materials.

There is a large field of application for monochloracetaldehyde bisulfites as technical preservatives. They can be used for antibacterical combating of mucus, e.g. in the paper industry. Paper coating and printing substances remain germ-free with a corresponding additive. Further forms of application comprise the addition or incorporation of monochloracetaldehyde bisulfites to glues and other adhesive substances, protein-, cellulose-, carbohydrate compounds, thickeners, plasticizers, sizings, finishes, emulsions, paints, plastic masses, protective coatings.

Hides and pelts are preserved by adding a monochloracetaldehyde bisulfite to the preserving salt and during the tanning process, e.g. into the softener bath, cleaning and pickling. Besides the bactericidal and bacteriostatic effect there is also a fungicide activity, e.g. against mold fungus. The occurrence of *Aspergillus niger, Penicillium glaucum*, etc. on leather, in a vegetable tanning liquid, etc. is prevented by treating the leather respectively adding 0.5% of a monochloracetaldehyde bisulfite to the liquid. The fungicide effect is likewise found against plant-pathogenic fungi.

As an algicide, sodiummonochloracetaldehyde bisulfite for instance at a concentration of 1:20,000 has an algostatic effect for about 14 days. When surface-active substances are admixed, this concentration can be reduced down to 1:40,000.

The active microbiocide substances of the invention, monochloracetaldehyde bisulfites, are prepared as described in Beilstein, Handbook of Organic Chemistry, 4th ed. (1918), vol. 1, p. 612, in the case of the sodium salt. The variation of the cation does not substantially influence the microbiocidal activity of the compounds and falls within the scope of the invention.

EXAMPLE 1

A 2% addition of a monochloracetaldehyde bisulfite to common salt when preserving hides keeps the hides forever free from any attack by every bacteria or fungi. A wetting agent can be added.

EXAMPLE 2

A 1% addition of a monochloracetaldehyde bisulfite to the softener water of hides in combination with the usual detergents, soda and the like prevents any activity by mircoorganisms. After 4 weeks the baths still do not give off any odor. They are clear and fresh. There is no loss of substance in the hides.

EXAMPLE 3

4% aqueous casein solutions, 1% gelatin solutions and tanners liquor after cooking were preserved by adding ½% of a monochloracetaldehyde bisulfite. After 4 weeks the preparations were still free of bacteria and fungi.

EXAMPLE 4

Washing agents, e.g. anion active and non-ionic wash-active substances were mixed with 5% of a monochloracetaldehyde bisulfite and a 4% washing liquor was made therefrom. The wash was exceptionally free of germs. This also applies when customary washing aids, phosphates, silica gels, bleaching agents, etc. are added.

EXAMPLE 5

By treating commodities with a 1% solution of a monochloracetaldehyde bisulfite in water with a 30% portion of alcohol the fungus Epidermophyton interdigital was killed without the treated matter causing any skin irritation.

EXAMPLE 6

In the agar plate and nutrient broth tests the limiting values of sodiummonochloracetaldehyde bisulfite for *Bacillus subtilis* were determined. After a 3-day incubation period at 32° C. the following values were found.

TABLE 1

Agar plate test

Monochloracetaldehyde bisulfite (p.p.m.):
 1000 ---------------------------------------- 0
 500 ----------------------------------------- 0
 250 ----------------------------------------- 1
 100 ----------------------------------------- 1
 50 ------------------------------------------ 3
 Control ------------------------------------- 5

Nutrient broth test

Monochloracetaldehyde bisulfite (p.p.m.):
 1000 ---------------------------------------- 0
 500 ----------------------------------------- 0
 250 ----------------------------------------- 0
 100 ----------------------------------------- 0
 50 ------------------------------------------ 1
 10 ------------------------------------------ 3
 Control ------------------------------------- 5

Note.—0=no growth; 5=full growth.

EXAMPLE 7

Leather discs were immersed in a ½% solution of a monochloracetaldehyde bisulfite for ¼ hour. After 6 weeks, the discs which had been stored in damp chambers with a relative humidity above 98%, did not show any mold formation. The untreated samples were completely overgrown with *Aspergillus niger* and *Penicillium glaucum*.

EXAMPLE 8

The following plant pathogenic fungi were tested:

TABLE 2

| | Sodiummonochloracetaldehyde bisulfite, p.p.m. | | | | |
|---|---|---|---|---|---|
| | 1,000 | 500 | 250 | 100 | Control |
| *Plasmopara viticola* | 0 | 0 | 0 | 1 | 5 |
| *Botrytis cinera* | 0 | 2 | 3 | 4 | 5 |
| *Cseudoperonospora humili* | 0 | 0 | 2 | 3 | 5 |
| *Fusarium oxysporum* | 0 | 1 | 3 | 4 | 5 |

Note.—0=no growth; 5=full growth.

EXAMPLE 9

Effect on a 3% gelatin jelly by airborne germs at 20° C.:

TABLE 3

| Substance | Parts | Additive (concentration in percent by wt.) |
|---|---|---|
| (a) None | | |
| (b) Sodiummonochloracetaldehyde bisulfite | 100 | 1.0 |
| | | 0.5 |
| | | 0.2 |
| | | 0.1 |
| (c) Sodiummonochloracetaldehyde bisulfite plus fatty alcohol sulfonate. | 80 / 20 | 1.0 |
| | | 0.5 |
| | | 0.2 |
| | | 0.1 |
| (d) Sodiummonochloracetaldehyde bisulfite plus sodium pentachlorphenol. | 85 / 15 | 1.0 |
| | | 0.5 |
| | | 0.2 |
| | | 0.1 |
| (e) Sodiummonochloracetaldehyde bisulfite plus quart. ammonia salt. | 95 / 5 | 1.0 |
| | | 0.5 |
| | | 0.2 |
| | | 0.1 |

While the untreated control samples were already liquified after 3 days by gelatin-liquefying bacteria like *Proteus vulgaris*, the treated samples after 8 days, with concentrations of 0.1–1% of monochloracetaldehyde bisulfite or of the mixtures given above did not indicate any bacterial activity.

Other disinfectants and preserving substances like formaldehyde, quinoline derivatives, etc. can be added in the same manner as is shown in Example 9d in combination with sodium pentachlorphenol.

EXAMPLE 10

10 parts of a monochloracetaldehyde bisulfite, 79.9 parts water, 10 parts isopropyl alcohol, 0.1 part quart. ammonia salt. Depending on its use, this preparation is further thinned. The solutions exhibit a very good disinfectant effect.

One can make effective aqueous solutions alone, also with additives of alcohols (mono- or polyvalent) and/or acetone, using at the same time a wetting or enveloping agent, e.g. a fatty alcohol sulfonate or a quart. ammonia salt.

EXAMPLE 11

5 parts of a monochloracetaldehyde bisulfite are stirred into 95 parts of soft soap. The washing strength is preserved. The soap has a highly disinfectant effect. The same effect is achieved when monochloracetaldehyde bisulfite is added to solid or liquid soaps, ointment bases or powders.

EXAMPLE 12

Algostatic effect of sodiummonochloracetaldehyde bisulfite in combination with surface-active substances on Chlorophyceae (*Chorella vulg.*). Appraisement of the productivity after 10 days.

| Concentration | Monochloracetaldehyde bisulfite | Monochloracetaldehyde bisulfite plus 2% cetyl-pyridium chloride |
|---|---|---|
| 1:20,000 | No growth of algae | No growth of algae. |
| 1:40,000 | Light growth of algae | Do. |

Without treatent with monochloracetaldehyde bisulfite the inoculated cultures show very active growth of algae during the observation period.

EXAMPLE 13

Agar diffusion test (aperture method) for determining the bacteriostatic effect of sodiummonochloracetaldehyde bisulfite. The ring breadth of the four obstruction areas was appraised after 48 hours. Incubation at 37° C.

The figures represent the average ring width of the obstruction areas in mm. At 25 mm. there is practically no growth on the plate.

TABLE 4

| Test germs | Concentration of sodiummonochloracetaldehyde bisulfite | | | |
|---|---|---|---|---|
| | 1% | 0.5% | 0.1% | |
| Staphylococcus aureus haem | >25 | 22.5 | 20 | Width of obstruction areas in mm. |
| Echerchia coli | >25 | 14.5 | 11 | Do. |
| Pseudomonas pyocyanea | >25 | 24 | 18 | Do. |
| Bacterium poteus | >25 | >25 | >25 | Do. |
| Bacillus subtilis | >25 | 23.5 | 17.5 | Do. |

The example shows the high bacteriostatic effect of monochloracetaldehyde bisulfite.

EXAMPLE 14

Examination for fungus growth: in the concentrations 0.2% and 0.02% of sodiummonochloracetaldehyde bisulfite the following fungi were tested in the nutrient test solution (Czapek-Dox solution with peptone) after a four-week growth.

Note.—0=total suppression; 5=complete growth.

TABLE 5

| Fungi | Concentration of sodiummonochloracetaldehyde bisulfite | |
|---|---|---|
| | 0.2% | 0.02% |
| Trichophyton menntagrophytes | 0 | 0 |
| Trichophyton rubrum | 0 | 0 |
| Scopulariopsis brevicaulis | 0 | 2 |
| Chrysosporium pannorum | 0 | 0 |
| Chaetomium globosum | 0 | 0 |
| Merulius lacrimans | 0 | 4 |
| Polyporus destructor | 0 | 2 |

The example shows the good fungicidal effect of monochloracetaldehyde bisulfite.

The invention claimed is:

1. A method for controlling bacteria, fungi and algae which comprises applying to said bacteria, fungi and algae an effective amount of sodium monochloracetaldehyde bisulfite.

2. Method of claim 1, in which the sodium monochloracetaldehyde bisulfite is applied with an inert substance containing 0.02–10 weight percent of said compound.

References Cited

UNITED STATES PATENTS 3,149,152   9/1964   Boehme _____ 260—513

OTHER REFERENCES

Chemical Abstracts, vol. 51, 1957, p. 11645(c).
Beilstein: Handbook of Organic Chemistry, 4th ed. (1918), vol. 1, p. 612.

ALBERT T. MEYERS, Primary Examiner

JEROME D. GOLDBERG, Assistant Examiner